United States Patent [19]

Sugiura et al.

[11] Patent Number: 4,985,189
[45] Date of Patent: Jan. 15, 1991

[54] METHOD OF PRODUCING A SKIN-COVERED PAD FOR A SEAT

[75] Inventors: Takashi Sugiura; Ichiro Matsuura; Fumio Miyauchi; Toyoharu Chiyoshi, all of Ayase, Japan

[73] Assignee: Ikeda Bussan Co., Ltd., Ayase, Japan

[21] Appl. No.: 199,344

[22] Filed: May 26, 1988

[51] Int. Cl.⁵ ............................................. B29C 51/00
[52] U.S. Cl. ..................... 264/26; 264/46.4; 264/46.6; 264/265
[58] Field of Search .................. 264/26, 27, 46.4 S, 264/46.6, 468, 594, 265

[56] References Cited

U.S. PATENT DOCUMENTS

| 2,914,109 | 11/1959 | Hsu et al. | 264/26 |
| 2,946,713 | 7/1960 | Dusina et al. | 264/26 |
| 2,948,929 | 8/1960 | Stallard | 264/26 |
| 3,265,551 | 8/1966 | Ananian et al. | 264/26 |
| 4,561,917 | 12/1985 | Urai | 156/73.1 |
| 4,680,150 | 7/1987 | Matsuda | 264/26 |

FOREIGN PATENT DOCUMENTS

| 0263798 | 10/1987 | European Pat. Off. |  |
| 2746686 | 4/1979 | Fed. Rep. of Germany . | |
| 2347306 | 11/1977 | France . | |
| 2439525 | 5/1980 | France . | |
| 60-230830 | 11/1985 | Japan | 264/27 |
| 61-007379 | 3/1986 | Japan | 264/27 |
| 62-257825 | 11/1987 | Japan | 264/46.8 |
| 999515 | 7/1965 | United Kingdom . | |

Primary Examiner—David A. Simmons
Assistant Examiner—Allan R. Kuhns
Attorney, Agent, or Firm—Foley & Lardner, Schwartz, Jeffery, Schwaab, Mack, Blumenthal & Evans

[57] ABSTRACT

A method of producing a skin-covered pad for a seat, which includes (a) preparing a lower mold which has a cavity formed therein, the lower mold having a first electrode mounted thereto through an insulator, the first electrode having a plurality of projections which are exposed to the cavity; (b) putting a bag-shaped outer skin member into the cavity, the skin member being thermally plastic; (c) putting an upper mold on the lower mold to close the cavity, the upper mold having an aperture formed therethrough; (d) projecting a press member into the cavity through the aperture, the press member having at its work head a second electrode secured thereto through an insulator, the second electrode having at its front face recesses which are shaped to match with the projections of the first electrode; (e) pressing the recessed face of the second electrode against the projections of the first electrode with a part of the outer skin member therebetween; (f) applying a high frequency current between the first and second electrodes thereby to heat and thus soften the part of the outer skin member; (g) separating the recessed face of the second electrode from the projections of the first electrode; and (h) pouring a liquid material for foamed plastic into the cavity and curing the same.

5 Claims, 1 Drawing Sheet

METHOD OF PRODUCING A SKIN-COVERED PAD FOR A SEAT

BACKGROUND OF THE INVENTION

1. Field of the Invention

The present invention relates in general to a method of producing a skin-covered pad of a seat, and more particularly to a method of producing a skin-covered pad which has decorative grooves formed on a front face thereof.

2. Description of the Prior Art

Hitherto, in the field of seat manufacturing, a so-called "skin-covered pad" has been widely used as a cushion member of a seat cushion and/or a seatback. The skin-covered pad is arranged on the seat structure with its front face exposed to the outside. Usually, the skin-covered pad is produced by pouring a liquid material for foamed polyurethane or the like into a bag-shaped outer skin member held in a mold, and thereafter, curing the same in a suitable manner.

In order to improve the external appearance, some of the skin-covered pads are provided at their front faces with a plurality of decorative grooves or the like.

One of the methods for producing such grooves is disclosed in Japanese Patent First Provisional Publication No. 60-160990. In this method, the decorative grooves are previously provided to the bag-shaped outer skin member before the skin member is subjected to the molding of the polyurethane foam. That is, the bag-shaped outer skin member with the grooves is put into a mold, and thereafter, a liquid material for foamed polyurethane is poured into the skin member and cured in a known manner. In order to properly hold the skin member, the mold has at its cavity bottom a corresponding number of projections for engagement with the grooves of the skin member.

However, providing the grooves to the skin member prior to the urethane molding increases the number of production steps of the skin-covered pad. Furthermore, proper positioning of the skin member to the mold is difficult or at least troublesome due to provision of the projections on the cavity bottom of the mold. In fact, if the urethane molding is carried out with the grooves of the skin member mismatched with the corresponding projections of the mold, an inferior product is inevitably produced.

SUMMARY OF THE INVENTION

It is therefore an object of the present invention to provide a method of producing a skin-covered pad having decorative grooves or recesses formed thereon, which method is free of the above-mentioned drawbacks.

According to the present invention, there is provided an improved method of producing a skin-covered pad for a seat. The method comprises (a) preparing a lower mold which has a cavity formed therein, the lower mold having a first electrode mounted thereto through an insulator, the first electrode having a plurality of projections which are exposed to the cavity; (b) putting a bag-shaped outer skin member into the cavity, the skin member being thermally plastic; (c) putting an upper mold on the lower mold to close the cavity, the upper mold having an aperture formed therethrough; (d) projecting a press member into the cavity through the aperture, the press member having at its work head a second electrode secured thereto through an insulator, the second electrode having at its front face recesses which are shaped to match with the projections of the first electrode; (e) pressing the recessed face of the second electrode against the projections of the first electrode with a part of the outer skin member therebetween; (f) applying a high frequency current between said first and second electrodes thereby to heat and thus soften the part of the outer skin member; (g) separating the recessed face of the second electrode from the projections of the first electrode; and (h) pouring a liquid material for foamed plastic into said cavity and curing the same.

According to the present invention, there is further provided a mold assembly for producing a skin-covered pad. The mold assembly comprises a lower mold having a cavity formed therein; a first electrode mounted to the lower mold and having a plurality of projections which are exposed to the cavity; an upper mold which is to be put on the lower mold to close the cavity, the upper mold having an aperture formed therethrough; a press member which is to be projected into the cavity through the aperture of the upper mold; a second electrode mounted to a work head of the press member and having at its front face recesses which are shaped to match with the projections of the first electrode; and energizing means for applying a high frequency current between the first and second electrodes.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, a method according to the present invention will be described in detail with reference to the accompanying drawings.

Figure 1:
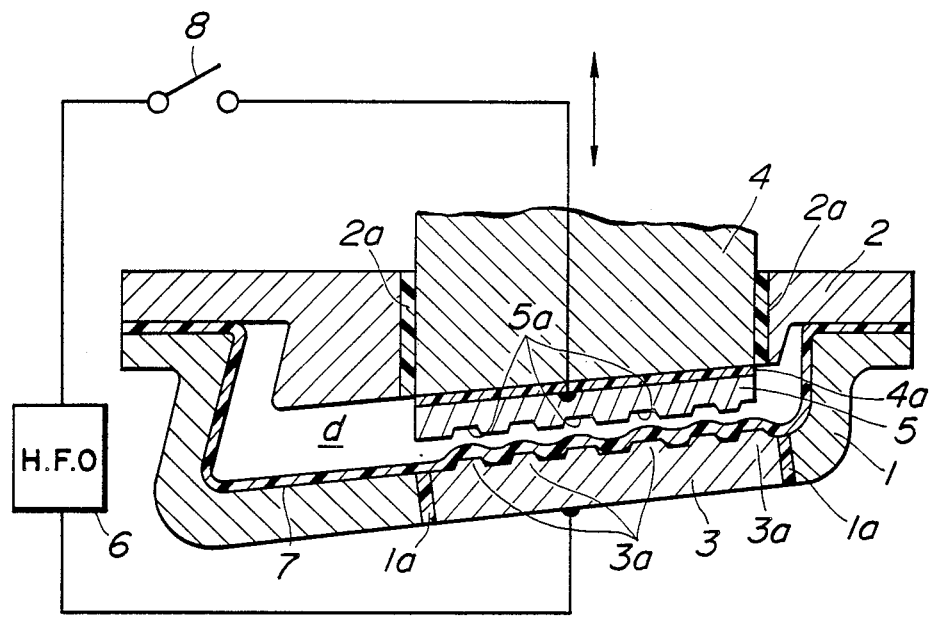
FIG. 1 is a sectional view of a mold assembly which is used in a method according to the present invention.

FIG. 1 shows a mold assembly which is used in the method of the invention.

In the drawing, numeral 1 denotes a lower mold having a cavity "d" which is shaped to match with the contour of a seat cushion to be produced. Numeral 2 denotes an upper mold which is put on the lower mold 1 to close the cavity "d" of the latter.

The lower mold 1 is provided with an electrode 3 which is connected thereto through an insulator 1a. The electrode 3 has a major surface which is exposed to the cavity "d" of the lower mold 1. The major surface of the electrode 3 is integrally formed with a plurality of parallel ridges or projections 3a for the purpose which will be clarified hereinafter.

The upper mold 2 is formed with an aperture (no numeral) the peripheral wall of which is lined with an insulator 2a. A press member 4 is slidably projected into the cavity "d" through the aperture of the upper mold 2. The press member 4 has a work head to which another electrode 5 is connected through an insulator 5a. The electrode 5 is formed at its front face with parallel grooves 5a or recesses which are snugly engageable with the ridges 3a of the lower electrode 3.

The two electrodes 3 and 5 are connected through respective wires (no numerals) to a high frequency oscillator 6. The wire connected to the upper electrode 5 is equipped with a switch 8.

Figure 2:
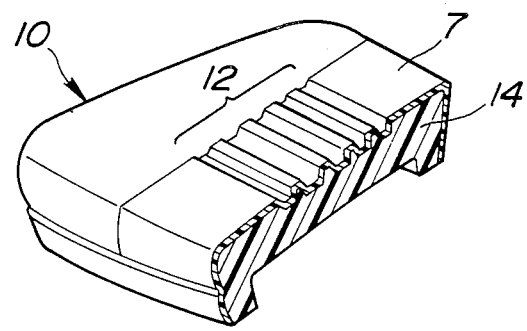
FIG. 2 is a partially cut perspective view of a skin-covered pad produced by the method of the invention.

In the following, the steps for producing the skin-covered pad 10 (see FIG. 2) will be described.

First, a bag-shaped outer skin member 7 is prepared. The skin member 7 is constructed of a layered material which comprises a thermoplastic leather (such as, polyvinyl leather, polyethylene leather or the like) and a wadding lined on one side of the thermoplastic leather. Unlike the case of the afore-mentioned conventional method, the bag-shaped outer skin member 7 has a flat outer surface.

The outer skin member 7 is put into the cavity "d" of the lower mold 1 having the outer surface thereof intimately contacted with the wall of the cavity "d". Then, the upper mold 2 is put on the lower mold 1. With this, the peripheral edge of the skin member 7 is unmovably held between respective peripheral portions of the two molds 1 and 2 as is understood from FIG. 1.

Then, the press member 4 is put into the aperture of the upper mold 2 and projected into the cavity "d" of the lower mold 1 by such a degree that the grooves 5a of the upper electrode 5 are snugly engaged with the ridges 3a of the lower electrode 3 with an interposal of the skin member 7 therebetween.

Then, the switch 8 is closed to apply a high frequency current to the pressed portion of the skin member 7. With this, the pressed portion is heated, so that the same is softened and thus intimately lined over the ridges 3a of the lower electrode 3, as will be seen from FIG. 1.

Then, the switch 8 is opened to cool the pressed portion of the skin member 7. Thereafter, a liquid material for a foamed polyurethane is poured into the cavity "d" through an opening (not shown) formed in the upper mold 2 while lifting the press member 4 to such a position where the grooved face of the upper electrode 5 is flush with an inner wall (no numeral) of the upper mold 2. With this, the cavity "d" is filled with the liquid urethane material.

After the material is hardened to a sufficient level, the upper mold 2 is dismantled from the lower mold 1 together with the press member 4. Then, a product, viz., a skin covered pad 10 with decorative grooves 12 as shown in FIG. 12, is dismantled from the lower mold 1.

Since the grooves 12 of the bag-shaped outer skin member 7 are produced by the mold assembly, there is no need of handling the skin member 7 for the positioning thereof relative to the lower mold 1 before the molding of the urethane foam. In fact, the afore-mentioned mismatching between the grooves of the skin member and the projections of the cavity bottom of the mold does not occur.

What is claimed is:

1. A method of producing a skin-covered pad for a seat, comprising:
    (a) preparing a lower mold which has a cavity formed therein, said lower mold having at its bottom a first electrode mounted thereto through an insulator, said first electrode having a plurality of projections which are exposed to said cavity;
    (b) putting a bag-shaped outer skin member into said cavity, said skin member being thermally plastic;
    (c) putting an upper mold on said lower mold to close said cavity, said upper mold having an aperture formed therethrough;
    (d) projecting a press member into said cavity through said aperture, said press member having at its work head a second electrode secured thereto through an insulator, said second electrode having at its front face recesses which are shaped to match with said projections of the first electrode;
    (e) pressing the face of the second electrode against the projections of the first electrode with a part of the outer skin member placed therebetween;
    (f) applying a high frequency current between said first and second electrodes thereby to heat and thus soften said part of the outer skin member;
    (g) separating the face of the second electrode from the projections of the first electrode;
    (h) pouring a liquid material for foamed plastic into said cavity and curing the same.

2. A method as claimed in claim 1, in which the step (g) is carried out while the step (h) is being carried out.

3. A method as claimed in claim 2, in which said step (g) includes a step (i) of moving said press member to such a position that the recessed front face of the second electrode 5 is flush with an inner wall of said upper mold.

4. A method as claimed in claim 3, in which said bag-shaped outer skin member is constructed of a layered material which comprises a wadding lined with a thermoplastic leather.

5. A method as claimed in claim 4, in which the step (c) is so made that a peripheral edge of the skin member is unmovably held between respective peripheral edges of said lower and upper molds.

* * * * *

UNITED STATES PATENT AND TRADEMARK OFFICE
CERTIFICATE OF CORRECTION

PATENT NO. : 4,985,189

DATED : Jan. 15, 1991

INVENTOR(S) : SUGIURA et al

It is certified that error appears in the above-identified patent and that said Letters Patent is hereby corrected as shown below:

On the title page: Item [45], insert an asterick

After line [73] of the title page the following should be included:

--[*] Notice: The portion of the term of this patent subsequent to December 12, 2006 has been disclaimed.--

Signed and Sealed this

Twenty-sixth Day of January, 1993

*Attest:*

STEPHEN G. KUNIN

*Attesting Officer*     *Acting Commissioner of Patents and Trademarks*